United States Patent

[11] 3,615,669

[72] Inventors Eddy R. Hair
Colerain Township;
Robert A. Cody, Forest Park; Aubrey R. McLain, Wyoming, all of Ohio
[21] Appl. No. 649,020
[22] Filed June 26, 1967
[45] Patented Oct. 26, 1971
[73] Assignee The Procter & Gamble Company
Cincinnati, Ohio

[54] PROCESS FOR AGGLOMERATING INSTANT COFFEE
9 Claims, No Drawings

[52] U.S. Cl. .................................................. 99/71, 23/313
[51] Int. Cl. .................................................. A23f 1/08
[50] Field of Search ........................................... 99/71, 199, DIG. 4, 65; 23/313

[56] References Cited
UNITED STATES PATENTS

| | | | |
|---|---|---|---|
| 2,897,084 | 7/1959 | Peebles .................. | 99/71 |
| 2,931,728 | 4/1960 | Franck .................... | 99/71 |
| 3,135,612 | 6/1964 | Hair ....................... | 99/199 X |
| 3,391,003 | 7/1968 | Armstrong ............... | 99/199 X |
| 3,419,399 | 12/1968 | Earle ...................... | 99/71 |
| 3,443,959 | 5/1969 | Ciboit ..................... | 23/313 X |
| 2,931,727 | 4/1960 | Kraut ...................... | 99/65 X |
| 3,493,388 | 2/1970 | Hair ....................... | 99/71 |
| 3,493,389 | 2/1970 | Hair et al. ................ | 99/71 |

*Primary Examiner*—Frank W. Lutter
*Assistant Examiner*—Robert Halper
*Attorney*—Richard C. Witte

ABSTRACT: Instant coffee particles can be agglomerated efficiently by spraying onto a gently agitated bed of the particles a small amount of a highly concentrated solution of coffee solubles in water.

PROCESS FOR AGGLOMERATING INSTANT COFFEE

BACKGROUND OF THE INVENTION

A number of properties of instant coffee can be modified by agglomerating techniques wherein two or more individual particles are combined with the aid of an agglomerating fluid to form a single, porous, larger particle. The agglomerate can be given a darker and more appealing color. Particle size and bulk density can be varied. Most importantly, the speed of dissolution in water can be increased.

In the past, a number of fluids have been used in various processes for agglomerating instant coffee particles. For example, coffee oil has been used as an agglomerating fluid. Coffee oil, however, has not proved to be a satisfactory agglomerating fluid for a number of reasons. In particular, the agglomerates which are formed using coffee oil as an agglomerating fluid are comprised of a small number of adhering coffee particles held together by the surface tension of the coffee oil and the capillary attraction thereof for the particles. These binding forces, which exist primarily at the points of contact of the oil, generally are not strong. Such agglomerates are not satisfactory because they lack structural strength, i.e., the agglomerates are very friable. In addition the use of a large amount of coffee oil, i.e., an amount sufficient to give efficient agglomeration, can give a product which is sticky or tacky.

Water and steam have been used as agglomerating fluids and the agglomerates formed with these agglomerating fluids have good structural strength. These agglomerates have good structural strength because these agglomerating fluids, unlike coffee oil, partially dissolve the coffee particles and when the agglomerates are formed actual physical bonds are formed among the particles creating a strong agglomerate. These particular agglomerating fluids are not totally satisfactory, however, because these agglomerating fluids are not very efficient agglomerating agents. These agglomeration fluids are not efficient agglomerating agents because these fluids are not tacky or sticky; therefore, these fluids do not readily aggregate the coffee particles into agglomerates. To achieve somewhat more efficient agglomeration large amounts of these agglomerating fluids can be used. As a result, however, post agglomeration drying can be necessary. Other low viscosity liquids have been used as agglomerating agents; but generally these liquids give the same problems in the agglomerating process as water and steam.

SUMMARY OF THE INVENTION

This invention presents a novel process for agglomerating instant coffee particles involving the use of an agglomerating fluid which is a highly concentrated solution of coffee solubles in water. This novel agglomeration process is efficient and in a preferred embodiment the process is especially advantageous since a post-agglomeration drying step is not required. More specifically, this invention involves a process for producing an agglomerated instant coffee which comprises gently agitating instant coffee particles having a moisture content from about 1.5 percent to about 4.0 percent by weight, and spraying thereon from about 1 percent to about 10 percent, by weight of the instant coffee particles, of an aqueous solution containing from about 40 percent to about 70 percent by weight coffee solubles, preferably such that an agglomerated instant coffee having a maximum moisture content of about 5 percent by weight is produced. The above-described process have been found to be a surprisingly effective and efficient method of agglomerating instant coffee. The agglomerates obtained in the process of this invention have good structural strength. They are free flowing and readily soluble in water. In addition, in the preferred embodiment of the invention where the final agglomerated product moisture content is maintained below 5 percent by weight no post-agglomeration drying operation is required. Avoiding a post-agglomeration drying operation is advantageous for such an operation can be time consuming and cumbersome, and can be detrimental to the flavor of the agglomerated instant coffee.

DISCUSSION OF THE INVENTION AND ITS PREFERRED EMBODIMENTS

The advantages of the process of this invention are derived from the unique agglomerating properties of the above-described agglomerating fluid which is an aqueous solution containing from about 40 percent to about 70 percent by weight of coffee solubles. This aqueous solution containing from about 40 percent to about 70 percent of coffee solubles is quite viscous and tacky. The viscous tacky character of this agglomerating fluid promotes efficient agglomeration on contact with the instant coffee particles. In addition, unlike coffee oil the water in the agglomerating fluid of this invention penetrates the dry particles and distributes the agglomerating fluid through the agglomerates which are formed. It does not, therefore, adversely affect the flowability of the final product. Coffee oil, on the other hand, remains in large part on the surface of the instant coffee particles and tends to produce a caked mass unless special precautions are taken. More importantly, the product formed utilizing the agglomerating fluid of this invention is much less friable than agglomerates formed using coffee oil as an agglomerating fluid.

The agglomerating fluid of this invention, which is an aqueous solution, forms structurally strong agglomerates in much the same fashion as water. The agglomerating fluid of this invention, however, is significantly and surprisingly better than water or other low-viscosity fluids, such as dilute extracts containing from about 5 percent to about 15 percent by weight of coffee solubles which do not possess the viscous tacky nature of the highly concentrated solution of coffee solubles. As mentioned hereinbefore, because of its tacky nature, this concentrated solution of coffee solubles is highly effective in aggregating instant coffee particles. This unique agglomerating fluid is advantageous in that it penetrates the instant coffee particles, but due to its high viscosity the moisture in the concentrated coffee solution does not penetrate the instant coffee particles which it contacts as rapidly as does pure water or other low-viscosity agglomerating fluids, rather the tackiness of the wetted instant coffee particles remains for a substantial period of time allowing contact with a large number of dry instant coffee particles. Overall, it has been found that the high-viscosity agglomerating fluids of this invention provide an agglomerating operation that is unexpectedly efficient.

It is important that the agglomerating fluid used in the process of this invention contain at least about 40 percent by weight of coffee solubles since substantially lower concentrations will not give an efficient agglomerating process. Concentrations of coffee solubles higher than about 70 percent, however, are generally not practical since such high concentrations are very viscous and, therefore, extremely difficult to spray.

In preferred embodiments of this invention the original moisture content of the coffee particles is from about 2 percent to about 3.5 percent by weight, and the final moisture content of the agglomerated product is from about 2.5 percent to about 5 percent, most preferably from about 2.5 percent to about 4.5 percent, by weight. The amount of the concentrated coffee solution agglomerating fluid used is preferably from about 2 percent to about 8 percent by weight of the dry instant coffee particles and preferably contains from about 45 percent to about 60 percent by weight of coffee solubles. In the operation of the process of this invention from about 20 percent to about 50 percent by weight of the dry instant coffee particles generally are transformed into agglomerates in a single step. Particles which are not agglomerated can be recycled in the process for further agglomeration.

The instant coffee particles used in the process disclosed herein can be prepared by any convenient process. A variety of such processes are known to those skilled in the art. Conventionally, instant coffee is prepared by roasting and grinding a blend of coffee beans, extracting the roast and ground coffee with water to form an aqueous coffee extract, and drying the extract to form "instant coffee." Various techniques, the most important of which are discussed below, allow (1) the production of instant coffee particles, and (2) the removal and preservation of the more fugitive coffee flavor materials, which can be added to instant coffee particles in a manner wherein they are not destroyed.

Typical roasting equipment and methods for roasting coffee beans are described, for example, in Sivetz & Foote, "Coffee Processing Technology," Avi Publishing Co., Westport, Conn., 1963, Vol. 1 pp. 203–26. Coffee oil is often expelled from a portion of the roasted beans prior to grinding. The oil, which contains a significant amount of high-quality coffee flavor and aroma constituents, is chilled to about 40° F. or less and saved for addition to the dry, instant coffee product generally immediately prior to packaging. The coffee beans which have not been oil expelled are ground, preferably to a United States Standard screen size of from about 8 mesh to about 20 mesh, and extracted with water to obtain an aqueous solution of coffee solubles. (Typical oil expelling equipment is described, for example, in Sivertz, "Coffee Processing Technology," Avi Publishing Co., Westport, Conn., 1963, Vol. 2, pp. 27–30; typical grinding equipment is described, for example, in Sivertz & Foote, supra, pp. 239–50.)

While numerous types of continuous or batch extraction systems can be used, the most commonly used system for the extraction of roast and ground coffee is a multicolumn extraction train. The system is composed of a number of elongated extraction columns connected in series for continuous countercurrent operation. While in these columns, and prior to extraction, the roast and ground coffee can be distilled to remove a volatile flavor fraction, and the flavor fraction condensed. The distillation often is accomplished by passing steam through the coffee column for from about 10 to about 45 minutes. The condensate can be added immediately to a previously obtained water extract; preferably, it is chilled to about 40° F. and saved for use in the agglomeration operation, as more fully described below.

Once the distillation operation is completed, the coffee is extracted by admitting hot water, such as from about 320° F. to about 375° F. to the last column of the extraction train. The temperature of the water is allowed to decrease by natural heat losses or by intercolumn heat exchangers as it passes through the system. The water extract is withdrawn from the column containing the freshest, i.e., previously unextracted, roast and ground coffee at a temperature of from about 190° F. to about 230° F. (Typical disclosures of equipment and methods which can be used in the above operations are as follows: steam distillation—Sivetz, supra, pp. 43–46, U.S. Pat. No. 2,562,206 to Nutting, issued July 31, 1951; extraction—Sivetz & Foote, supra, pp. 261–378, and U.S. Pat. No. 2,515,730 to Ornfelt, issued July 18, 1950)

Once the aqueous coffee extract has been obtained, it is preferable that the extract be concentrated to at least about 45 percent by weight coffee solubles. This concentration step is particularly beneficial for extracts which contain a previously obtained distillate for the high concentration of coffee solubles helps to preserve the fugitive coffee flavor materials from deterioration. Concentration can be effected by any conventional method, such as freeze concentration, thin film evaporation, flashing under reduced pressure, or by the addition of previously dried instant coffee powder, i.e., soluble coffee solids.

The aqueous extract can be dried in any known manner to obtain instant coffee. Freeze drying, vacuum drying, drum drying or other known processes can be used. If the resulting dry product is not in the form of particles, it can be broken up by a number of methods to form instant coffee particles. The preferred method for drying the aqueous extract is conventional spray drying wherein the liquid extract is sprayed into a tower and simultaneously contacted with a flow of hot air, conventionally from about 350° F. to about 650° F. Water is removed from the droplets of the aqueous coffee extract as they fall through the spray tower and they emerge from the bottom as porous, spherical particles of instant coffee containing, for example, from about 1.5 percent to about 4.5 percent by weight moisture. (Typical disclosures of spray drying processes which can be used to prepare instant coffee particles can be found, for example, in Sivetz & Foote, "Coffee Processing Technology." Avi Publishing Co., Westport, Conn., 1963, Vol. 1, pp. 382–513, and in U.S. Pat. Nos. 2,771,343 to Chase et al., issued on Nov. 20, 1956; 2,750,998 to Moore, issued on June 19, 1956; and 2,469,553 to Hall, issued on May 10, 1949.)

The agglomerating fluid utilized in the process of this invention is a concentrated aqueous coffee solution which can be conveniently prepared by concentrating a conventional aqueous coffee extract prepared as described above. Concentration can be by any of a number of conventional techniques such as those discussed above for the concentration of coffee extracts prior to drying. In preferred operation, however, coffee solids are added to a stream distillate prepared as described above to produce an aqueous solution containing about 40 percent to about 70 percent by weight coffee solubles. It has been found that the use of this agglomerating fluid produces a flavor benefit in the final product because the flavor rich distillate is added directly to the instant coffee without being subjected to a drying operation wherein some of the volatile flavors are lost.

In agglomerating instant coffee according to the process of this invention, the concentrated aqueous coffee solution containing from about 40 percent to about 70 percent by weight of coffee solubles is sprayed onto a gently agitated bed of instant coffee particles to produce the agglomerated instant coffee product. Preferably a spray or pressure nozzle or other device is used which produces a spray having droplets a preponderance of which are from about 50 to about 500 microns in diameter. Droplets of this size produce the most highly desirable size of instant coffee agglomerates while retaining a desirable moisture content. With droplets below 50 microns in diameter the droplets are not sufficiently large to aggregate a sufficient number of coffee particles to produce a desirably sized agglomerate. With droplet sizes above about 500 microns the agglomerates produced, while sufficiently large, have an undesirably high moisture content. Most preferably, a preponderance of the droplets, i.e., at least 50 percent, are from about 100 to about 300 microns in diameter.

Any of a number of methods of obtaining a gentle agitation of the instant coffee particles can be used. Agitation should be sufficient to promote sufficient intermixing of the coffee particles to allow the coffee solution to contact and aggregate a number of instant coffee particles. At the other extreme, agitation cannot be so vigorous that the agglomerates which have been formed are broken. One convenient method which produces gentle agitation involves the use of a rotating drum which tumbles the instant coffee particles while the coffee solution is sprayed thereon. A preferred method is the use of a gently fluidized bed of instant coffee particles. While the bed can be fluidized mechanically a more efficient fluidization is obtained in a gas fluidization bed. The fluidization rate is not critical and need only be sufficient to promote the gentle agitation of coffee particles defined above. Any gas may be used which will not adversely affect the flavor of the instant coffee particles. Typical examples of such gasses are air, nitrogen and carbon dioxide. The moisture content of the fluidizing gas or atmosphere in which the agglomeration process takes place is not critical but should be sufficiently low to keep the final instant coffee product within the moisture content limits defined above.

The following examples are given to illustrate several preferred embodiments of the agglomeration process for instant coffee particles disclosed herein. These examples are not intended to be limitations upon the invention. Unless stated to the contrary all percentages and ratios in the examples are on a weight basis.

EXAMPLE 1

Seven pounds of instant coffee particles which had a moisture content of 3.1 percent were agglomerated in the following manner.

The instant coffee particles were gently agitated in a rotating inclined drum. On to the gently agitated bed of instant coffee particles in the drum was sprayed 0.28 pounds of an agglomerating fluid which was an aqueous solution containing about 50 percent by weight of coffee solubles. This agglomerating fluid was prepared dissolving 1 part by weight of instant coffee particles in 1 part by weight of water. The agglomerating fluid was sprayed on with a sprayer which provided a spray having particles predominately in the size range of from about 50 to about 500 microns.

The spraying was done over a period of about 7 minutes. There was no post-agglomeration drying operation. The particles formed were free-flowing and had a moisture content of about 4.7 percent. They were collected and classified as to size.

Before agglomeration the instant coffee particles were classified as to size on U.S. Standard Screens with the following results:

BEFORE AGGLOMERATION

| Screen No. | Sieve Opening | Percent retained on screen |
|---|---|---|
| 16 | 1.19 mm. | 0 |
| 20 | 0.84 mm. | 0 |
| 30 | 0.59 mm. | 9% |

After agglomeration, the particles were again sized on U.S. Standard Screens with the following results:

AFTER AGGLOMERATION

| Screen No. | Sieve Opening | Percent retained on screen |
|---|---|---|
| 16 | 1.19 mm. | 0.5% |
| 20 | 0.84 mm. | 7.9% |
| 30 | 0.59 mm. | 41.6% |

It is clear that the agglomeration process was very effective in that over 40 percent by weight of the particles were agglomerated into larger particles.

EXAMPLE 2

Six pounds of instant coffee particles which had a moisture content of 1.8 percent were efficiently agglomerated in the following manner.

The instant coffee particles were gently agitated in a fluidized bed. This fluidized bed of instant coffee particles was obtained by placing the instant coffee particles in a vessel which had the form of a truncated cone, and allowing a stream of air which entered the apex, to flow upward through the vessel. The top portion of this vessel was 5 feet in diameter and sealed; the bottom portion was 4 inches in diameter and sealed by means of a removable plug. Near the top portion of this vessel was an outlet which was connected to an exhaust fan capable of exhausting 250 cubic feet of air per minute. This exhaust fan was activated and the plug at the apex (the bottom portion of the vessel) was removed. The rush of air entering the vessel fluidized the instant coffee particles in the vessel providing a gently agitated fluidized bed of instant coffee particles.

A spray nozzle was then inserted through the opening at the apex of the vessel and the gently agitated fluidized bed of instant coffee particles was sprayed with 0.6 pounds of agglomerating fluid in about 30 seconds.

This agglomerating fluid, an aqueous solution containing about 50 percent by weight of coffee solubles, was prepared by dissolving 1 part by weight of instant coffee in 1 part by weight of water. The spray nozzle provided a spray having particles predominately in the size range of from about 50 to about 500 microns.

When the spraying was completed, the exhaust fan was turned off, and free-flowing agglomerated instant particles which had a moisture content of 4.2 percent and needed no additional drying were collected.

EXAMPLE 3

When in example 2, the agglomerating fluid is prepared by adding 1 part by weight of instant coffee particles to 1 part by weight of a steam distillate of roast and ground coffee so that an agglomerating fluid containing about 50 percent by weight of coffee solubles is prepared, substantially the same results are obtained in that the instant coffee particles are effectively agglomerated.

What I claim is:

1. A process for agglomerating instant coffee particles which comprises (1) gently agitating instant coffee particles having a moisture content of from about 1.5 percent to about 4.5 percent by weight, (2) spraying thereon from about 1 percent to about 10 percent, by weight of the instant coffee particles, of an agglomerating fluid, the agglomerating fluid bearing an aqueous solution containing from about 40 percent to about 70 percent by weight of coffee solubles, to produce an agglomerated instant coffee.

2. The process of claim 1 wherein the agglomerated instant coffee has a maximum moisture content of 5 percent.

3. The process of claim 1 wherein the agglomerated instant coffee has a maximum moisture content of 4.5 percent.

4. The process of claim 1 wherein the instant coffee particles have a moisture content of from about 2 percent to about 3.5 percent.

5. The process of claim 1 wherein there is sprayed on the instant coffee particles from about 2 percent to about 8 percent, by weight of instant coffee particles, of agglomerating fluid.

6. The process of claim 1 wherein the agglomerating fluid contains from about 45 percent to about 60 percent by weight of coffee solubles.

7. The process of claim 1 wherein the agglomerating fluid is sprayed on in the form of droplets which are from about 50 microns to about 50 microns in size.

8. The process of claim 1 wherein the agglomerating fluid is sprayed on in the form of droplets which are from about 100 microns to about 300 microns in size.

9. The process of claim 2 wherein the agglomerating fluid is prepared by adding coffee solids to a steam distillate of roast and ground coffee to produce the aqueous solution.

* * * * *